Aug. 9, 1960  L. E. FISHER  2,948,771
PLUG-IN BUSWAY
Filed Oct. 31, 1956
2 Sheets-Sheet 1

INVENTOR
LAWRENCE E. FISHER
BY Martin Kalikow
THEIR ATTORNEY

Aug. 9, 1960  L. E. FISHER  2,948,771
PLUG-IN BUSWAY
Filed Oct. 31, 1956  2 Sheets-Sheet 2

INVENTOR
LAWRENCE E. FISHER
BY Martin Kalikow
THEIR ATTORNEY

United States Patent Office 2,948,771
Patented Aug. 9, 1960

2,948,771
PLUG-IN BUSWAY

Lawrence E. Fisher, Southington, Conn., assignor to General Electric Company, a corporation of New York Filed Oct. 31, 1956, Ser. No. 619,580

1 Claim. (Cl. 174—99)

This invention relates to electric power distribution systems of the busway type and particularly to means for supporting and insulating bus bar conductors in such systems.

As a result of the great increase in size and capacity of power generating and distributing equipment in recent years, there has been a substantial rise in the level of maximum current which can be drawn from power systems by short circuits. Available short-circuit currents of fifty thousand amperes (asymmetrical), for example, are now not uncommon. Many electric power distributing systems of the prior art type, however, are not capable of withstanding the forces created by magnetic fields accompanying such high short-circuit currents. This is particularly true in the case of plug-in type power distribution systems, that is, systems which are adapted to receive plug-in type power take-off devices.

It is an object of the invention to provide a busway distribution system including bus bar supporting and insulating means which will render the system able to withstand short-circuit currents of greater magnitude than can be tolerated by comparable systems heretofore available.

Another object of the invention is to provide a bus bar supporting means for such electric power distribution systems capable of withstanding high short-circuit currents which shall also be relatively inexpensive and easy to assemble.

A further object of the invention is to provide an electric power distribution system comprising bus bar supporting and insulating means of the above-mentioned type requiring only a small number of basic component parts, which parts may be used to provide insulating and supporting assemblies for systems having bus bars of greatly varying sizes.

In accordance with the invention in one form, I provide an electric power busway comprising a plurality of elongated generally parallel bus bar conductors, spacers of insulating material between adjacent bus bars to withstand compressive short-circuit forces, i.e., forces tending to move the bus bars toward each other, and a flexible tension member encircling the bus bars and the insulating spacers and having its ends joined under initial tension so as to compress the bus bars and insulating spacers together and to withstand tension short-circuit forces, i.e., forces tending to move the bus bars away from each other.

Figure 4:
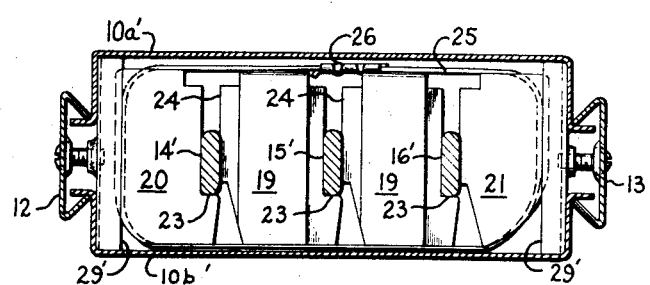
Figure 5:
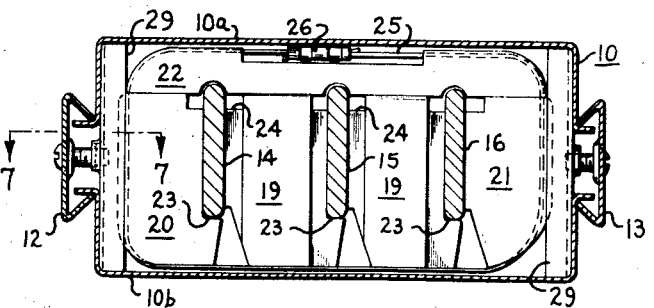
Figure 6:
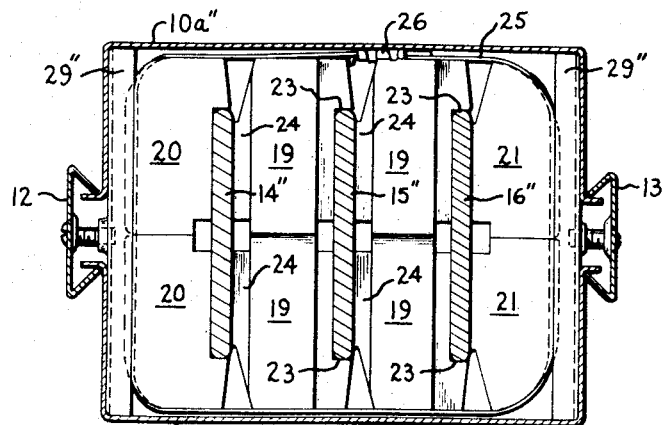
Figure 7:
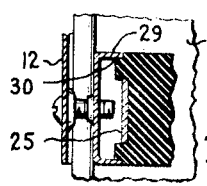

Figures 4, 5, and 6 are cross-sectional views of busway systems of varying ampere capacity and varying bus bar size, constructed in accordance with the invention and showing how the same component parts are used to support and insulate bus bar conductors having a given thickness but having small, medium, and large width dimensions respectively;

Figure 7 is a detail view taken on the line 7—7 of Fig. 5 and showing particularly the interengagement of the insulator assembly with the busway enclosure.

Figure 3:
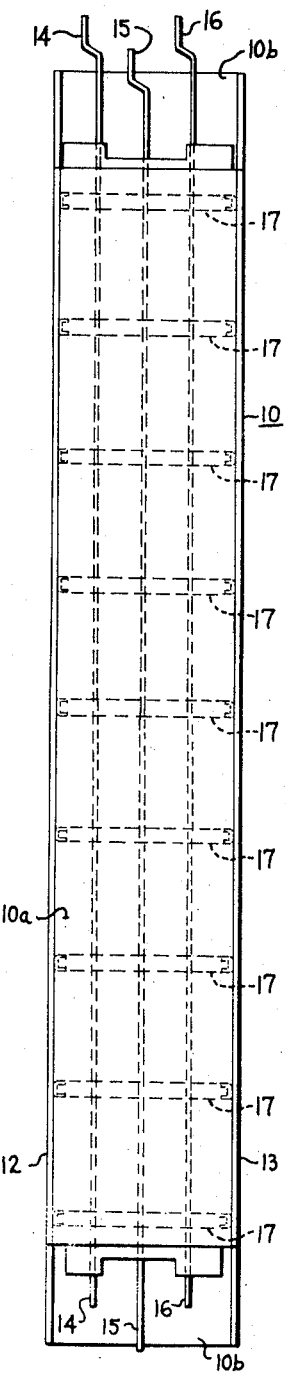
Figure 3 is a top plan view of a section of busway constructed in accordance with the invention and indicating the relative location of the bus bar insulating and supporting assemblies of Fig. 1.

Referring to the drawings, I have shown the invention as incorporated in a busway comprising prefabricated longitudinal sections (see Fig. 3) including an elongated generally rectangular enclosure 10 having top and bottom covers 10a and 10b and side channels 12 and 13. Supported within the outer enclosure 10 are a plurality of elongated generally parallel bus bar conductors 14, 15 and 16. The bus bars 14, 15 and 16 are supported within the outer enclosure by means of a supporting and insulating assembly indicated generally at 17. Insulating and supporting assemblies may be provided in accordance with the invention for use with systems having bus bars of greatly varying sizes as shown, for instance, in Figs. 4, 5, and 6, respectively. For convenience, an intermediate size, shown in Figs. 1 and 5, will be first described.

Figure 1:
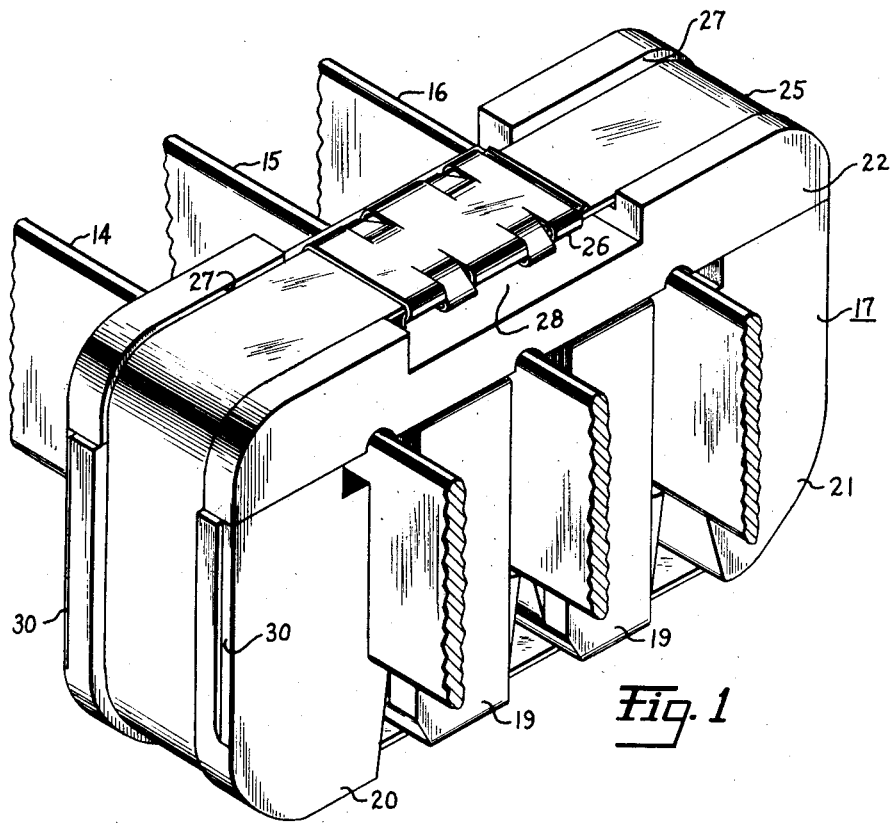
Figure 1 is a perspective view of a portion of a busway system constructed in accordance with the invention and showing particularly the bus bar insulating and supporting assembly.
Figure 2:
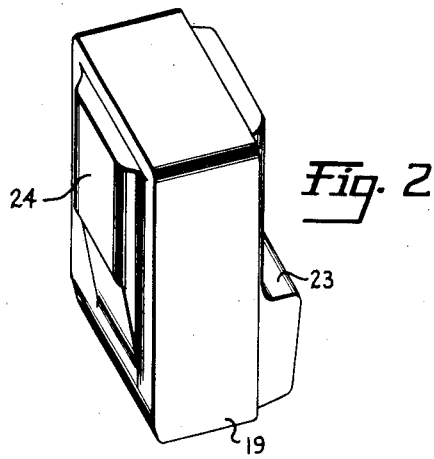
Figure 2 is a view in perspective of one of the intermediate insulating spacer members utilized in the assembly of Fig. 1.

The bus bar insulating and supporting assembly shown in Figs. 1 and 5 includes a plurality of intermediate insulating and supporting spacer members 19, end insulating spacer blocks 20 and 21, and a top insulating spacer block 22.

Each of the insulating and supporting members 19 and 20 is provided with a bus bar supporting shoulder 23 on one face thereof. Each of the spacers 19 and 20 also includes a generally rectangular raised or offset portion 24 on a face opposite from shoulder 23. As will be seen from the figures, especially Fig. 5, when the insulating spacers and bus bars are assembled together, the bus bars 14, 15 and 16 have one edge resting on a shoulder 23 of one block, and are retained thereon by the raised portion 24 of the adjacent insulating block.

The insulating spacer blocks 19, 20 and 21 are preferably made of a material which has good insulating and dielectric properties, which is non-carbonizing (i.e., leaves no carbon residue when exposed to an electric arc) and which also has relatively high strength in compression, such for example, as ceramic or porcelain materials. Spacer members comprising blocks of such material of substantial thickness have been found highly effective in resisting the high forces created by magnetic field accompanying short-circuit currents and tending to force the bus bars toward each other.

In order to absorb the forces tending to separate the bus bars 14, 15 and 16 during short circuits and to provide the necessary strength in tension to the insulator assembly, there is provided an elongated, relatively wide, thin strap of metallic material 25 encircling the entire assembly of bus bars and insulating spacers and having its ends overlapped and joined together by suitable connecting means such as by the connector 26.

For the purpose of retaining the strap 25 in place with respect to the insulating blocks, each of the insulating blocks is provided with a channel-shaped recess 27 in that portion thereof which forms part of the periphery of the assembly, the channel being adapted to receive the strap 25. In order to facilitate the installation of the connector 26, the insulating support 22 may also be provided with a generally rectangular recess 28.

Each of the insulating assemblies 17 is adapted to be retained in place in the enclosure 10 by the walls of the enclosure, and also by the channel members 29 (see Fig. 7), the edges of which are adapted to engage raised surfaces 30 on the insulators 20 and 21. The channel members 29 additionally serve as a means of facilitating the assembly of the top and bottom covers and side members of the enclosure 10.

The bus bar insulating and supporting assembly provided by the invention is extremely compact and provides a maximum amount of strength both in compression and tension restraining the bus bars 14, 15 and 16 from moving toward or away from each other. This great strength is afforded by the combination of the great compressive strength of the ceramic or porcelain material in the spacer blocks and the high tension strength in the steel strap 25.

When it is desired to use the insulating spacer blocks to assemble a busway including bus bars of smaller size than that of Fig. 5, the top insulating block 22 is omitted and different enclosure top and bottom walls 10a' and 10b' are provided (see Fig. 4), together with shortened channel members 29'. For the purpose of preventing any movement of the bus bars 14', 15' and 16' toward the top or bottom wall of the enclosure 10, when the form of Fig. 4 is used, successive insulating assemblies may be reversed in their positioning within the enclosure 10 in alternate longitudinal locations along the busway. The shoulders 23 of alternate insulating spacing blocks therefore engage alternate edges of the bus bars 14', 15' and 16' and thereby restrain movement of such bus bars in either direction.

In Fig. 6 I have shown the insulating spacing blocks 19, 20 and 21 used in assembling a busway incorporating bus bars 14", 15" and 16" having a width substantially double that of the bars of Fig. 5. In this case two of each of the insulators 19, 20 and 21 are used at each location, the block 22 again being omitted, and modified cover sections 10a" and 10b" and channel members 29" are provided.

Busway systems incorporating insulating assemblies of the present invention have been tested and found able to withstand short-circuit currents substantially in excess of fifty thousand amperes, asymmetrical.

While I have shown only three embodiments of the invention, it will be obvious to those skilled in the art that many modifications thereof may readily be made, and I therefore intend by the appended claim to cover all such modifications as fall within the true spirit and scope of the invention.

What I claim as new and desire to secure by Letters Patent of the United States is:

An electric power busway comprising a plurality of elongated generally parallel bus bar conductors, an elongated generally rectangular housing, insulating means supporting said bus bar conductors in side-by-side relation in a row transversely of said housing, comprising a plurality of insulating spacer blocks between said bus bar conductors, said insulating spacer blocks comprising a generally rectangular block of insulating material having a shoulder provided on one lateral face thereof adapted to support the edge of one of said bus bar conductors, and a generally rectangular projecting area on the opposite face of said insulating block adapted to press against a side of one of said bus bar conductors and to retain said bus bar conductor on the shoulder portion of the adjacent insulating spacer block.

References Cited in the file of this patent

UNITED STATES PATENTS

| | | |
|---|---|---|
| 400,013 | Steinberg | Mar. 19, 1889 |
| 2,247,088 | Hill | June 24, 1941 |
| 2,438,362 | Dunkelberger et al. | Mar. 23, 1948 |
| 2,466,912 | Rice | Apr. 12, 1949 |
| 2,576,774 | Carlson | Nov. 27, 1951 |
| 2,653,991 | Dyer et al. | Sept. 29, 1953 |
| 2,749,385 | Adam | June 5, 1956 |